United States Patent [19]

Chewuk et al.

[11] Patent Number: 4,780,805
[45] Date of Patent: Oct. 25, 1988

[54] LOW/HIGH INPUT VOLTAGE POWER SUPPLY

[75] Inventors: Andrew J. Chewuk, Deltona; Harold H. Cheffer, Longwood; James L. Gates, Apopka, all of Fla.

[73] Assignee: NCR Corporation, Dayton, Ohio

[21] Appl. No.: 151,033

[22] Filed: Feb. 1, 1988

Related U.S. Application Data

[63] Continuation-in-part of Ser. No. 76,413, Jul. 21, 1987, abandoned.

[51] Int. Cl.<sup>4</sup> ............................................. H02M 7/19
[52] U.S. Cl. .................................... 363/142; 363/143; 323/299; 307/75; 361/90; 361/91; 361/92
[58] Field of Search ................ 363/142, 143; 323/299, 323/300; 307/65, 75, 80; 361/88, 89, 90, 91, 92

[56] References Cited

U.S. PATENT DOCUMENTS

| | | | |
|---|---|---|---|
| 3,713,018 | 1/1973 | Braunschweig | 363/143 |
| 3,720,868 | 3/1973 | Lee | 363/143 X |
| 3,900,787 | 8/1975 | Köster | 363/143 X |
| 4,590,546 | 5/1986 | Maile | 363/143 X |
| 4,608,500 | 8/1986 | Togawa | 363/143 X |
| 4,654,538 | 3/1987 | Lethellier | 363/143 X |
| 4,665,323 | 5/1987 | Russell et al. | 363/142 X |
| 4,675,801 | 6/1987 | Terada | 363/143 |

Primary Examiner—Patrick R. Salce
Assistant Examiner—Emanual Todd Voeltz
Attorney, Agent, or Firm—Wilbert Hawk, Jr.; Stephen F. Jewett

[57] ABSTRACT

A power supply which automatically configures itself to correctly respond to either a low or a high level of an A.C. supply voltage to supply a single level D.C. output voltage. The supply switches between a voltage doubler and a full wave rectifier operation dependent on the level of the A.C. supply voltage. Once the supply switches to the full wave rectifier configuration, a latch prevents the power supply from switching to the voltage doubler configuration until the A.C. supply voltage is removed from the power supply. The latch prevents damage to components by preventing the power supply from switching to a low input voltage configuration when, in fact, a high input voltage is present.

9 Claims, 1 Drawing Sheet

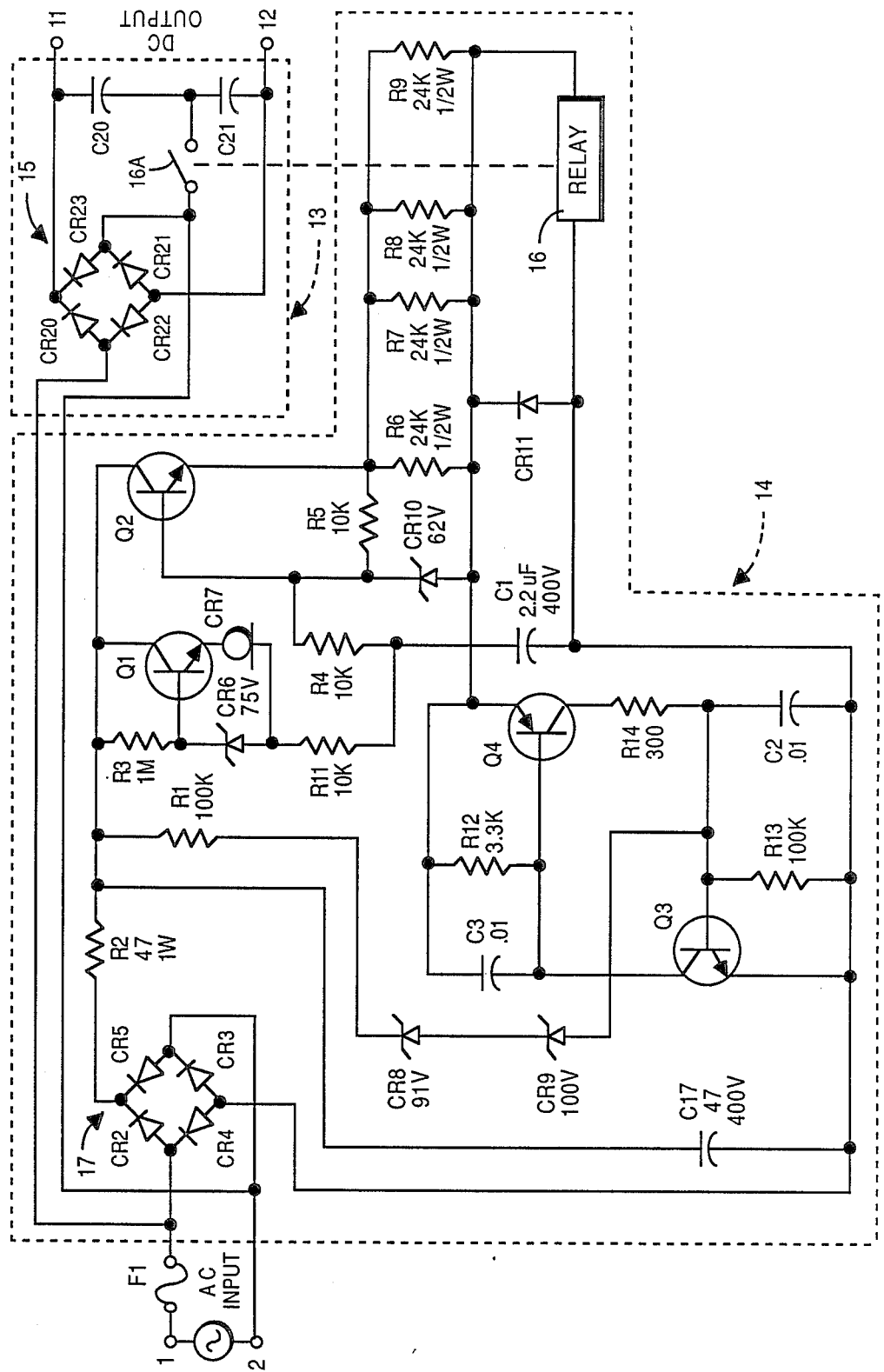

LOW/HIGH INPUT VOLTAGE POWER SUPPLY

CROSS REFERENCE TO RELATED APPLICATION

This is a continuation-in-part of co-pending application Ser. No. 076,413, filed on July 21, 1987 now abandoned.

BACKGROUND OF THE INVENTION

The present invention is directed to a power supply which maintains a substantially constant output voltage when connected either to a low or high level of voltage input. This type of power supply has particular utility with electronic equipment, such as computers, which are designed for use in more than one environment where different levels of A.C. 60 cycle power are provided. The most common levels encountered are 110 volts and 220 volts A.C. The equipment serviced by the power supply requires that the output of the power supply, which is generally a D.C. voltage, be maintained at a substantially constant value irrespective of the level of the A.C. input voltage. Generally speaking, in order to meet this requirement, a method is employed in which the magnitude of the A.C. input voltage is recognized and the internal circuitry of the power supply is adjusted so as to maintain the output voltage substantially constant. The most commonly used method of achieving this adjustment is to switch the power supply from a full wave rectifier operation to a voltage doubler operation. Various techniques have been used to accomplish the switching, e.g. from manually switching after identification of the level of the A.C. input voltage to systems which automatically detect the level of the A.C. input voltage source when the power supply is connected to the source. The automatic systems use electronic switching means to switch between the full wave rectifier operation and the voltage doubler operation in accordance with the level of the A.C. input voltage.

In U.S. Pat. No. 3,713,018 to C. T. Braunschweig, there is disclosed a capacitor charging circuit which, in one embodiment, uses a hand operated switch that is opened or closed as a function of the level of the A.C. voltage to be applied to the charging circuit to switch between the full wave rectifier operation and the voltage doubler operation. In another embodiment of the same patent, an electronic switch (triac), responsive to a voltage magnitude detecting circuit, is used to automatically provide the switching action.

In U.S. Pat. No. 3,900,787 to M. Koster, there is disclosed an automatic system which uses a thyristor switch, activated by an input voltage level sensing circuit, for connecting the power supply in either the voltage doubler or the rectifier configuration.

In U.S. Pat. No. 4,590,546 by D. W. Maile, a triac is used to automatically switch between the voltage doubler and the full wave rectifier configurations. The triac is activated by the level of the A.C. voltage applied to the circuit's input. Also, In U.S. Pat. No. 4,608,500 to J. Togawa and U.S. Pat. No. 4,654,538 to P. R. Lethellier, a triac is used to switch between the voltage doubler and the full wave rectifier configurations.

All of these prior art systems operate with the possibility that the system will not be in the correct operating mode when the A.C. input voltage is applied to the power supply. For example, if the switch is manually operated and the power supply is placed in the low level A.C. operating mode but is, in fact, attached to a high level A.C. input voltage, the D.C. output voltage from the power supply will be excessive to the point that damage will occur to the serviced equipment. In those prior art systems which have automatic A.C. level detection, interruptions, defaults and/or spikes in the A.C. input voltage may cause the power supply to respond with an erroneous level detection, which in turn will place the power supply in the wrong operating mode for the A.C. input voltage.

If a delay is provided to eliminate the possibility of the power supply responding to discontinuities and/or spikes, it will also be slow in responding to the actual A.C. input voltage level which in turn may cause damage to the serviced equipment. The highest probability of equipment damage is related to the erroneous detecting of the A.C. input voltage as being of a low level when, in fact, the voltage is at a high level. As previously mentioned, with such an error, the output D.C. voltage will be exceedingly high and it is this high D.C. voltage, at the output of the power supply, which causes the equipment damage. Another error in detecting occurs when a high voltage level is indicated to be at the input when, in fact, the voltage level is low. This will result in a below normal D.C. level at the output of the power supply, which would, of course, effect equipment performance, but would not necessarily cause equipment damage.

SUMMARY OF THE INVENTION

The present invention provides for the automatic configuration of a power supply by switching between either a voltage doubler or a full wave rectifier operating mode in response to the level of the A.C. input voltage and additionally, provides a circuit configuration which locks the power supply into the full wave rectifier operating mode once it has been switched to that mode and prevents the circuit from switching out of the full wave rectifier operating mode upon detecting a low level A.C. input voltage so as to prevent equipment damage.

The present invention utilizes a relay that is energized to close contacts for the voltage doubler operation when the A.C. input voltage to the power supply ranges between 90 to 136 volts and is deenergized to open contacts for the full wave rectifier operation when the A.C. input voltage is in the range of 190 to 256 volts. The relay is energized by a constant current source and is de-energized by a latching action. The circuit must be totally deenergized to reset the latch after entering the full wave rectifier operating mode. This feature provides for a fail-safe operation.

From the foregoing, it can be seen that it is a primary object of the present invention to provide a power supply which will automatically respond to different A.C. input voltage levels.

It is a further object of the present invention to provide a power supply that will automatically respond to a switch from a low to a high level of A.C. input voltage, but will not respond to a switch from a high level to a low level without being reset.

These and other objects of the present invention will become more apparent when taken in conjunction with the following description and drawing, which drawing forms a part of this disclosure.

BRIEF DESCRIPTION OF THE DRAWING

The single FIGURE in the accompanying drawing is a block diagram of a power supply in accordance with the presen invention.

DESCRIPTION OF THE PREFERRED EMBODIMENT

The present invention will be described in detail with reference to the preferred embodiment shown in the accompanying drawing.

The single FIGURE in the accompanying drawing shows the power supply having input terminals 1 and 2 for receiving the A.C. input voltage and terminals 11 and 12 for providing the D.C. output voltage to the serviced equipment (not shown for purposes of clarity). For the configuration shown, terminal 11 is positive with respect to terminal 12.

The power supply consists of an A.C. to D.C. conversion circuit 13 and a control circuit 14, each connected to terminal 1 by a fuse F1 for protecting the components of the power supply from excessive current. The conversion circuit 13 is conventional, acting as a peak charging circuit for converting the peak voltage of the A.C. input voltage across terminals 1 and 2 to a D.C. voltage across the output terminals 11 and 12. Conversion circuit 13 includes a diode bridge rectifier 15 (comprised of diodes CR20, CR21, CR22 and CR23), a pair of bulk storage capacitors C20 and C21 connected across the output of the diode bride rectifier and in parallel to the output terminals 11 and 12, and a switch 16A connected between the capacitors C20 and C21 to the input terminal 2. As will be described in greater detail in conjunction with control circuit 14, switch 16A is controlled by a relay 16 in circuit 14.

The conversion circuit 13 operates conventionally, in either a full wave rectifier operation or a voltage doubler operation. Briefly, when a high level A.C. input voltage (i.e., between 190 and 256 volts) is applied across input terminals 1 and 2, the switch 16 is open and the conversion circuit 13 operates as a full wave rectifier. The D.C. output of the bridge rectifier 15 is filtered by and appears across capacitors C20 and C21 and also output terminals 11 and·12. When a low level A.C. input voltage (i.e., between 90 and 136 volts) is applied across input terminals 1 and 2, the switch 16A is closed and converion circuit 13 operates as a voltage doubler. Capacitors C20 and C21 are charged in alternate cycles of the output of bridge rectifier 15 and the voltage across each of the capacitors C20 and C21 is added or "doubled" to provide the resulting filtered D.C. output to the terminals 11 and 12.

In accordance with the present invention, the control circuit 14 controls, by operation of switch 16A, the switching of conversion circuit 13 between either the full wave rectifier operating mode or the voltage doubler operating mode in response to the A.C. input voltage, and further locks the power supply into the full wave rectifier operating mode once it is in that mode to prevent inadvertent switching to the voltage doubler mode upon subsequent detection of a low level A.C. input voltage.

The control circuit 14 includes a full wave diode bridge rectifier 17 comprised of diodes CR2, CR3, CR4 and CR5. The D.C. current from bridge rectifier 17 is directed to a resister R2 and to a filter capacitor C17 connected across the output of the bridge rectifier 17 with the resulting rectified and filtered D.C. voltage across capacitor C17 providing a D.C. operating voltage for the other components (to be described) in the control circuit 14.

A transistor Q1 has its base biased by resistor R3, Zener diode CR6, resistor R11 and capacitor C1, to form a one milliampere current source for driving a transistor Q2. The collector of transistor Q1 is connected to the juncture of resistors R2 and R3. The emitter of transistor Q1 is connected to the juncture of resistor R11 and the diode CR6 by a diode CR7. Transistor Q2 has its collector connected to the juncture of resistors R2 and R3 and its emitter connected to one side of the relay 16 through a parallel resistance circuit comprised of resistors R6 through R9. The other side of the relay 16 is connected to the cathode of capacitor C17. Connected across the parallel group of resistors R6 through R9 is a Zener diode CR10 and a resistor R5 connected in series. The juncture of the resistor R5 and the diode CR10 is connected to the base of transistor Q2. A diode CR11 is connected across the relay 16. The diode CR11 allows for the circulation of the relay's collapsing magnetic field current when the relay 16 is de-energized. A resistor R4 is connected to the base of transistor Q2 and to the juncture of resistor R11 and the anode of capacitor C1. The cathode of capacitor C1 is connected to the cathode of capacitor C17.

Transistor Q2 and its associated circuitry form a ten milliampere current source which is turned on by the one milliampere current source (Q1, R11 and C1) and when turned on, the current through transistor Q2 energizes the relay 16. One end of a resistor R1 is connected to the anode of capacitor C17 and at the other end to a series connected pair of Zener diodes CR8 and CR9. The diode pair is in turn connected to the base of a transistor Q3 and to the cathode of capacitor C17, via a resistor R13. A transistor Q4 has its emitter connected to the juncture of diodes CR10 and CR11 and to its base by means of resistor R12 and a parallel connected capacitor C3. The base of transistor Q4 is connected directly to the collector of transistor Q3. The collector of transistor Q4 is connected to the base of transistor Q3, via a resistor R14 and to the cathode of capacitor C17 by means of a capacitor C2.

The circuit associated with transistor Q3 senses when the low level of A.C. input voltage has exceeded its upper range of 136 volts A.C. and drives transistor Q4 to de-energize relay 16. The transistors Q3, Q4, capacitors C3, C2, and resistors R12, R13, and R14, operate to form a latch which deenergizes the relay 16 when a high level voltage is present. The circuitry formed of resistors R4, R11, and capacitor C1 provides a delay during circuit energization to allow time for the circuit to determine the level of the A.C. input voltage.

The control circuit 14 operates, generally, as follows: A low level A.C. input voltage, that is, between 90 volts A.C. and 136 volts A.C., will result in relay 16 being energized and closing switch 16A. With a high level A.C. input voltage, that is, between 190 volts A.C. and 256 volts A.C., the relay 16 will be de-energized and open switch 16A. Decisions are made in the range below 90 volts A.C. and from 136 to 190 volts A.C. as to whether the relay 16 should be energized or not. More specifically, when the A.C. input voltage is applied to terminals 1 and 2, diodes CR2, CR3, CR4, and CR5, convert the A.C. input voltage to a D.C. voltage and resistor R2 allows the capacitor C17 to charge to the peak of the A.C. input voltage. As the D.C. charge (voltage) level on capacitor C17 increases, the constant current diode CR7 starts conducting, turning on transistor Q1. The resistor R3 provides transistor Q1 with base drive current and Zener diode CR6 clamps the voltage at the base of transistor Q1 at 75 volts to protect the diode CR7. This clamping action results in a constant current source of one milliampere through transistor Q1. This one milliampere current source in turn drives resistor R11, R4, C1 and transistor Q2.

The capacitor C1 charges through the resistor R11 allowing a time delay for the circuit to decide whether to energize or to de-energize the relay 16. If the A.C. input voltage does not exceed 136 volts A.C., capacitor C1 will continue to charge and its D.C. level will rise turning on transistor Q2 through resistor R4. Transistor Q2, resistors R5-R9, and Zener diode CR10, constitute the constant current source of 10 milliamperes which is required to energize the relay 16. As the charge on capacitor C1 continues to rise, transistor Q2 turns on energizing relay 16, thus closing switch 16A to make a voltage doubler configuration in conversion circuit 13.

If the A.C. input voltage is above 136 volts A.C. the capacitor C17 charges to a higher level, which is sensed by the Zener diodes CR8, CR9, and resistor R1, which conduct at this higher level turning on transistor Q3. Transistor Q3 being on activates the latch by turning on transistor Q4 which in turn latches transistor Q3 into the on condition through resistor R14. This action pulls the relay 16 coil voltage below its holding level to de-energize it. At the same time, capacitor C1 discharges through resistor R4. Once the circuit is latched in the high A.C. voltage mode, the circuit must be de-energized for the latch to release and upon re-energization will go through the above sequence to determine the correct mode of operation.

It should be appreciated that the bridge rectifier 17 (comprised of diodes CR2, CR3, CR4 and CR5) in control circuit 14 and bridge rectifier 15 (comprised of diodes CR20, CR21, CR22 and CR23) in conversion circuit 13 could both be replaced by a single bridge rectifier, providing both the D.C. output voltage across output terminals 11 and 12, as well as the D.C. operating voltage required in control circuit 14. However, separate bridge rectifiers in circuits 13 and 14 are preferred, since the level of D.C. voltages required to provide the D.C. output across capacitors C20 and C21 generate noise signals which might inadvertently trigger relay 16 if used to also drive control circuit 14.

While there has been shown what is considered to be the preferred embodiment of the present invention, it will be manifest that many changes and modifications may be made therein without departing from the essential spirit of the invention. It is intended, therefore, in the annexed claims to cover all such changes and modifications as may fall within the true scope of the invention.

We claim:

1. A low/high input voltage power supply which automatically configures itself to correctly respond to either a low or a high level of an A.C. supply voltage to supply a single level D.C. output voltage comprising:
   first and second supply terminals for receiving said A.C. supply voltage;
   rectifier means connected to said first and said second supply terminals for rectifying the received A.C. supply voltage and for furnishing a corresponding D.C. voltage;
   voltage doubler circuit means for doubling the corresponding D.C. voltage when connected to said rectifier means;
   switch means responsive to a current signal for connecting said voltage doubler circuit means in circuit with said rectifier means;
   current means responsive to the level of the furnished A.C. supply voltage for providing a current signal to said switch means for connecting said voltage doubler circuit means to said rectifier means when the level of said A.C. supply voltage is below a first value and for disconnecting said voltage doubler circuit means from said rectifier means when the level of said A.C. supply voltage is above the first value; and
   latching means coupled to said switch means and responsive to the level of said A.C. supply voltage for maintaining said switch means disconnecting said voltage doubler circuit means from said rectifier means once the level of said A.C. supply voltage rises above the first value until the A.C. supply voltage is no longer received at said first and said second supply terminals.

2. The low/high input voltage power supply according to claim 1 wherein said rectifier means is comprised of:
   a full wave diode bridge having a pair of inputs connected to said first and second supply terminals, and a pair of outputs, across which is provided said D.C. voltage.

3. The low/high input voltage power supply according to claim 2 wherein said switch means includes a relay.

4. The low/high input voltage power supply according to claim 1 wherein said low input voltage is one-half the value of said high input voltage.

5. The low/high input voltage power supply according to claim 1 further comprising second rectifier means connected to said first and said second supply terminals and having a pair of outputs for supplying a D.C. operating voltage to said current means and said latching means, and wherein said current means is comprised of:
   a first transistor;
   a capacitor connected in circuit with said first transistor across the outputs of said second rectifier means;
   biasing means responsive to the D.C. operating voltage from said second rectifier means for driving said first transistor into conduction as a current source; and
   a second transistor connected in series with said switch means across the outputs of said second rectifier means, for conducting in response to the conduction of said first transistor to provide the current signal to said switch means.

6. The low/high input voltage power supply according to claim 5 wherein said first and said second transistors each has an emitter, a collector, and a base, and further comprising:
   a diode connecting the emitter of said first transistor to said capacitor;
   a first Zener diode connecting said capacitor to the base of said first transistor;
   a second resistor connecting the base of said first transistor to said second rectifier means for receiving the D.C. operating voltage, with the collector of said first and said second transistors connected to said second rectifier means for receiving the D.C. operating voltage;

a group of parallel connected resistors connected between the emitter of said second transistor and said switch means; and a second Zener diode connected between the base of said second transistor and said switch means, the base of said second transistor connected to said capacitor.

7. The low/high input voltage power supply according to claim 6 wherein said latching means is comprised of:

third and fourth transistors each having an emitter, a collector, and a base;

third and fourth Zener diodes connected in series between the base of said third transistor and said second rectifier means;

the collector of said third transistor connected to the base of said fourth transistor, the emitter of said third transistor connected to said second rectifier means, the emitter of said fourth transistor connected to said switch means;

a third capacitor;

a third resistor connected in parallel with said third capacitor between the emitter and the base of said fourth transistor;

a fourth capacitor;

a fourth resistor connected in series with said fourth capacitor between the collector of said fourth transistor and said second rectifier means; and a fifth resistor connecting the base and the emitter of said third transistor.

8. The low/high input voltage power supply according to claim 1, further comprising second rectifier means connected to said first and said second supply terminals for supplying a D.C. operating voltage across its outputs to said current means and said latching means.

9. A low/high input voltage power supply which automatically configures itself to correctly respond to either a low or a high level of an A.C. supply voltage to supply a single level D.C. output voltage comprising:

rectifier means for receiving an A.C. supply voltage and for rectifying and filtering said A.C. supply voltage to provide a D.C. voltage;

doubler means connectable to said rectifier means when the A.C. supply voltage is of a low input;

switch means for connecting said doubler means to said rectifier means when the A.C. supply voltage is of a low level and for disconnecting said doubler means from said rectifier means when the A.C. supply voltage is of a high level; and latch means coupled to said switch means for maintaining said doubler means disconnected from said rectifier means when the A.C. supply voltage makes a transition from a high to a low level until the A.C. supply voltage is removed from said power supply.

* * * * *